(12) United States Patent
Kumagai et al.

(10) Patent No.: US 10,634,496 B2
(45) Date of Patent: Apr. 28, 2020

(54) SURVEYING SYSTEM

(71) Applicant: TOPCON Corporation, Tokyo-to (JP)

(72) Inventors: Kaoru Kumagai, Tokyo-to (JP); Jun-ichi Kodaira, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 452 days.

(21) Appl. No.: 15/620,939

(22) Filed: Jun. 13, 2017

(65) Prior Publication Data
US 2017/0363421 A1  Dec. 21, 2017

(30) Foreign Application Priority Data
Jun. 15, 2016  (JP) .................. 2016-118883

(51) Int. Cl.
| | | |
|---|---|---|
| *G01S 17/00* | (2020.01) | |
| *G01C 15/00* | (2006.01) | |
| *G01C 3/08* | (2006.01) | |
| *G01C 1/02* | (2006.01) | |
| *G01S 17/08* | (2006.01) | |
| *G01S 17/87* | (2020.01) | |
| *G01S 17/89* | (2020.01) | |
| *G01C 1/04* | (2006.01) | |

(52) U.S. Cl.
CPC ............. *G01C 15/002* (2013.01); *G01C 1/02* (2013.01); *G01C 3/08* (2013.01); *G01S 17/08* (2013.01); *G01S 17/87* (2013.01); *G01S 17/89* (2013.01); *G01C 1/04* (2013.01)

(58) Field of Classification Search
USPC ........................................................ 356/5.01
See application file for complete search history.

(56) References Cited

U.S. PATENT DOCUMENTS 7,605,756 B2 * 10/2009 Ash .................... G01C 7/04
342/385
8,045,762 B2 * 10/2011 Otani .................. G01C 3/00
348/42

(Continued)

FOREIGN PATENT DOCUMENTS

| JP | 2008-76303 A | 4/2008 |
|---|---|---|
| JP | 2008-82707 A | 4/2008 |

OTHER PUBLICATIONS

European Search Report for Application EP 17176261 (5 pages) (dated 2017).*

*Primary Examiner* — James R Hulka
(74) *Attorney, Agent, or Firm* — Nields, Lemack & Frame, LLC (57) ABSTRACT

A surveying system comprises a total station unit, a laser scanner unit and an arithmetic control unit. The total station unit comprises a frame unit, a telescope unit, a total station distance measuring unit accommodated in the telescope unit and a total station arithmetic control unit, wherein the laser scanner unit is provided on the frame unit and acquires point cloud data by rotatably irradiating a laser beam in a vertical direction, and wherein the arithmetic control unit acquires the point cloud data by a cooperation of a horizontal rotation of the frame unit and a rotary irradiation of the laser beam, compares a distance measurement result of the total station unit with a distance measurement result of the laser scanner unit and corrects the point cloud data based on a comparison result.

10 Claims, 7 Drawing Sheets

(56) References Cited

U.S. PATENT DOCUMENTS

| | | | | |
|---|---|---|---|---|
| 8,218,131 | B2* | 7/2012 | Otani | G01C 15/002 |
| | | | | 356/4.01 |
| 9,658,059 | B2* | 5/2017 | Metzler | G01C 15/002 |
| 9,658,335 | B2* | 5/2017 | Siercks | G01C 15/002 |
| 9,897,697 | B2* | 2/2018 | Singer | G01C 15/002 |
| 2007/0182632 | A1* | 8/2007 | Ash | G01C 7/04 |
| | | | | 342/463 |
| 2008/0075325 | A1 | 3/2008 | Otani et al. | |
| 2008/0075326 | A1 | 3/2008 | Otani et al. | |
| 2012/0033069 | A1* | 2/2012 | Becker | G01S 17/89 |
| | | | | 348/135 |
| 2015/0029489 | A1* | 1/2015 | Metzler | G01C 15/002 |
| | | | | 356/4.01 |
| 2015/0042977 | A1 | 2/2015 | Siercks et al. | |
| 2015/0138529 | A1* | 5/2015 | Singer | G01C 15/002 |
| | | | | 356/4.01 |
| 2017/0123054 | A1* | 5/2017 | Becker | G01S 17/89 |
| 2017/0184394 | A1* | 6/2017 | Ditte | G01S 17/42 |
| 2017/0285144 | A1* | 10/2017 | Kiryuu | G01S 17/42 |

\* cited by examiner

SURVEYING SYSTEM

BACKGROUND OF THE INVENTION

The present invention relates to a surveying system having functions of a total station and a laser scanner.

As a surveying instrument for determining three-dimensional coordinates of a measuring point with high accuracy, a total station is used, and there is a laser scanner for rotatably irradiating a pulsed light as a distance measuring light, performing a distance measurement for each pulsed light, and acquiring point cloud data.

The total station has extremely high measurement accuracy including an industrial measurement. In a case where the total station is used in a field of a surveying, for instance, a measurement accuracy of 1 mm or less is provided for a distance accuracy, and a sufficient accuracy required by a first-grade theodolite or the like is ensured for an angular accuracy.

On the other hand, although a three-dimensional scanner having spread in recent years is capable of measuring a point cloud in several hundreds of thousand points per second, and a highly efficient surveying at an extremely high speed is realized, a measurement accuracy is poorer than the total station.

SUMMARY OF THE INVENTION

It is an object of the present invention to provide a surveying system configured to improve an accuracy of point cloud data acquired function of a laser scanner by using a measurement result obtained by a function of a total station by comprising the function of the total station and the function of the laser scanner.

To attain the object as described above, a surveying system according to the present invention comprises a total station unit, a laser scanner unit and an arithmetic control unit, wherein the total station unit comprises a frame unit capable of horizontally rotating, a telescope unit provided capable of vertically rotating on the frame unit, a horizontal angle detector for detecting a horizontal angle of the frame unit, a vertical angle detector for detecting a vertical angle of the telescope unit, a total station distance measuring unit accommodated in the telescope unit and a total station arithmetic control unit, wherein the laser scanner unit is provided on an upper surface of the frame unit and is configured so as to acquire point cloud data by rotatably irradiating a laser beam in a vertical direction, and wherein the arithmetic control unit is configured so that it acquires the point cloud data of an entire object to be measured by a cooperation of a horizontal rotation of the frame unit and a rotary irradiation of the laser beam by the laser scanner unit, measures a specific point of the object to be measured by the total station unit, compares a distance measurement result of the total station unit of the specific point with a distance measurement result of the laser scanner unit and corrects the point cloud data based on a comparison result.

Further, in the surveying system according to the present invention, the total station unit and the laser scanner unit are arranged so that a first mechanical reference point of the total station unit and a second mechanical reference point of the laser scanner unit are positioned on a same vertical line.

Further, in the surveying system according to the present invention, the total station unit includes an image pickup unit, the image pickup unit acquires an image including the object to be measured, and wherein the arithmetic control unit is configured to superimpose the point cloud data on the image and associates the object to be measured with the point cloud data.

Further, in the surveying system according to the present invention, the total station unit includes a laser point unit and is configured so as to emit a pointer light to the image superimposed with the point cloud data and indicate a survey setting point.

Further, in the surveying system according to the present invention, a horizontal driving unit is provided on the frame unit, the laser scanner unit is provided on the total station unit via the horizontal driving unit, the laser scanner unit is capable of horizontally rotating by the horizontal driving unit, wherein the horizontal driving unit includes a laser scanner horizontal angle detector for detecting a relative rotation between the frame unit and the laser scanner unit, and wherein the arithmetic control unit is configured to control the horizontal driving unit so as to rotate the laser scanner unit at a predetermined rotation speed based on a detection result of the laser scanner horizontal angle detector and the horizontal angle detector.

Furthermore, the surveying system according to the present invention further comprises a synchronization signal generating unit, wherein a synchronization signal issued from the synchronization signal generating unit is given to point data of the point cloud data as a time stamp and is given to horizontal angle data of the horizontal angle detector as a time stamp when the point data is acquired, and an association between the point data and the horizontal angle data is performed through the time stamps.

According to the present invention, the surveying system comprises a total station unit, a laser scanner unit and an arithmetic control unit, wherein the total station unit comprises a frame unit capable of horizontally rotating, a telescope unite, provided capable of vertically rotating on the frame unit, a horizontal angle detector for detecting a horizontal angle of the frame unit, a vertical angle detector for detecting a vertical angle of the telescope unit, a total station distance measuring unit accommodated in the telescope unit and a total station arithmetic control unit, wherein the laser scanner unit is provided on an upper surface of the frame unit and is configured so as to acquire point cloud data by rotatably irradiating a laser beam in a vertical direction, and wherein the arithmetic control unit is configured so that it acquires the point cloud data of an entire object to be measured by a cooperation of a horizontal rotation of the frame unit and a rotary irradiation of the laser beam by the laser scanner unit, measures a specific point of the object to be measured by the total station unit, compares a distance measurement result of the total station unit of the specific point with a distance measurement result of the laser scanner unit and corrects the point cloud data based on a comparison result. As a result, an acquisition of the point cloud data and a measurement by the total station can be performed by one surveying instrument, a facility cost can be reduced, and further since the point cloud data is corrected based on the measurement by the total station, a measurement accuracy of the point cloud data is improved.

Further, according to the present invention, in the surveying system, the total station unit includes a laser point unit and is configured so as to emit a pointer light to the image superimposed with the point cloud data and indicate a survey setting point. As a result, the acquisition of the point cloud data and a survey setting work can be performed by one surveying instrument.

Furthermore, according to the present invention, in the surveying system, a horizontal driving unit is provided on the frame unit, the laser scanner unit is provided on the total station unit via the horizontal driving unit, the laser scanner unit is capable of horizontally rotating by the horizontal driving unit, wherein the horizontal driving unit includes a laser scanner horizontal angle detector for detecting a relative rotation between the frame unit and the laser scanner unit, and wherein the arithmetic control unit is configured to control the horizontal driving unit so as to rotate the laser scanner unit at a predetermined rotation speed based on a detection result of the laser scanner horizontal angle detector and the horizontal angle detector. As a result, the acquisition of the point cloud data and a measuring work by the total station can be performed by one surveying instrument and moreover at the same time.

DETAILED DESCRIPTION OF THE PREFERRED EMBODIMENT

A description will be given below on embodiments of the present invention by referring to the attached drawings.

Figure 1:
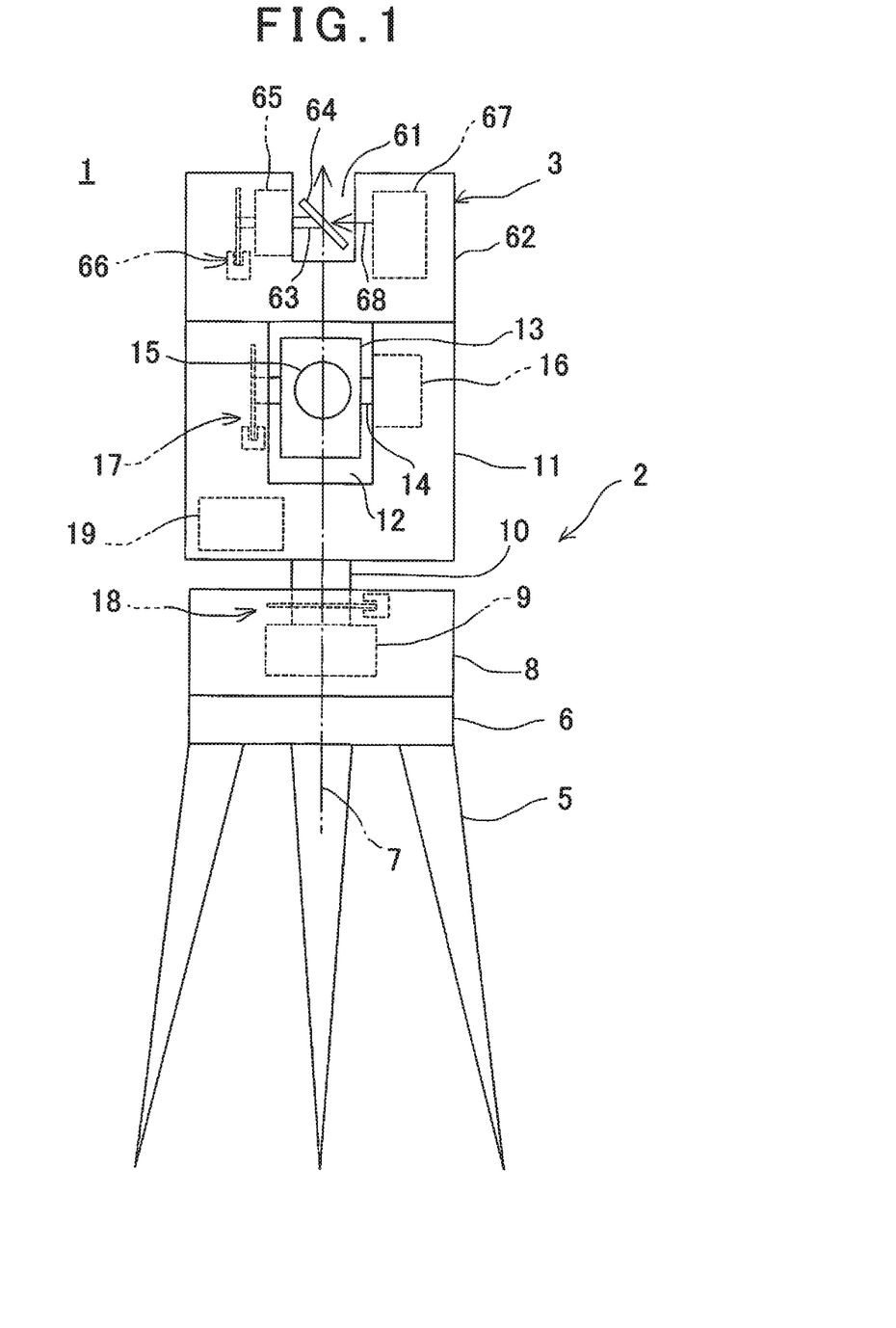
FIG. 1 is a schematical front view of a surveying system according to a first embodiment of the present invention.
Figure 2:
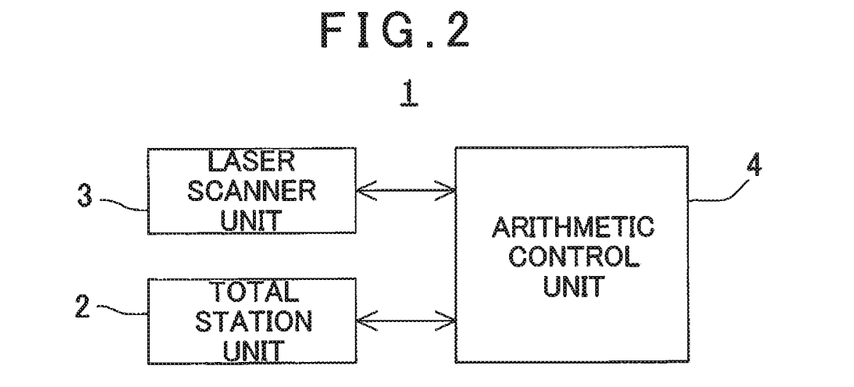
FIG. 2 is a schematical block diagram of the surveying system.

FIG. 1 and FIG. 2 show schematical drawings of a surveying system 1 according to a first embodiment of the present invention.

The surveying system 1 comprises a total station unit 2, a laser scanner unit 3 which is a two-dimensional laser scanner and an arithmetic control unit 4. The arithmetic control unit 4 integrally controls an operation of the total station unit 2 and an operation of the laser scanner unit 3 and performs a data processing such as a matching, a correction and the like of data acquired by the total station unit 2 and the laser scanner unit 3. It is to be noted that the arithmetic control unit 4 may be served by either one of a TS arithmetic control unit 19 (to be described later) provided in the total station unit 2 and an LS arithmetic control unit 71 (to be described later) provided in the laser scanner unit 3.

A tripod 5 is installed at a predetermined position, a leveling unit 6 is provided on the tripod 5, and the total station unit 2 is provided on the leveling unit 6. Further, the laser scanner unit 3 is provided on an upper surface of the total station unit 2.

The total station unit 2 has a first mechanical reference point (not shown), and the total station unit 2 and the laser scanner unit 3 are arranged so that a second mechanical reference point of the laser scanner unit 3 exists on a vertical line 7 passing through the first mechanical reference point.

First, by referring to FIG. 1, a description will be given on an approximate arrangement of the total station unit 2.

A lower end part of the total station unit 2 is designed as a base unit 8, and the base unit 8 is attached on the leveling unit 6 in the base unit 8, a horizontal rotation driving component 9 is accommodated. The horizontal rotation driving component 9 has a horizontal rotation shaft 10 extending vertically, and the horizontal rotation shaft 10 is rotatably provided on the base unit 8, and an axis of the horizontal rotation shaft 10 coincides with the vertical line 7.

On an upper end of the horizontal rotation shaft 10, a frame unit 11 which is a horizontal rotary unit is attached. On an upper surface of the frame unit 11, the laser scanner unit 3 is provided.

The frame unit 11 has a recess portion 12, and a telescope unit 13 which is a vertical rotary unit is accommodated in the recess portion 12. The telescope unit 13 is rotatably supported by the frame unit 11 via a vertical rotation shaft 14 having a horizontal axis.

In the telescope unit 13, a telescope (a lens unit) 15 having a distance measuring optical axis (to be described later; See FIG. 4) is provided, and a TS distance measuring unit 22 (to be described later) and the like are accommodated in the telescope unit 13. The distance measuring optical axis crosses the vertical line 7 and is orthogonal to an axis of the vertical rotation shaft 14. An intersection point between the distance measuring optical axis and the vertical line 7 may be set as the first mechanical reference point.

In the frame unit 11, a vertical rotation driving component 16 is accommodated, and the vertical rotation driving component 16 is connected to the vertical rotation shaft 14. By the vertical rotation driving component 16, the telescope unit 13 is rotated in a vertical direction via the vertical rotation shaft 14. On the vertical rotation shaft 14, a vertical angle detector 17 is provided, by the vertical angle detector 17, a vertical rotation angle of the vertical rotation shaft 14 is detected in real time, and further a vertical angle of the telescope unit 13 is detected.

The frame unit 11 is rotated by the horizontal rotation driving component 9 over a total circumference in a horizontal direction via the horizontal rotation shaft 10. Further, a horizontal angle detector 18 is provided on the horizontal rotation shaft 10, by the horizontal angle detector 18, a horizontal rotation angle of the frame unit 11 is detected, and further a horizontal angle (a horizontal angle of the telescope unit 13) of the frame unit 11 is detected in real time.

A rotation driving unit is constituted by the horizontal rotation driving component 9 and the vertical rotation driving component 16, and by the rotation driving unit, the telescope unit 13 is rotated in two directions of the vertical direction and the horizontal direction in a state as required. Further, the vertical angle detector 17 and the horizontal angle detector 18 make up a directional angle detector and are designed so as to detect the vertical angle and the horizontal angle (that is, a directional angle of the telescope unit 13) in real time.

Inside the frame unit 11, a total station arithmetic control unit (hereinafter referred as a TS arithmetic control unit) 19 is provided, and by the TS arithmetic control unit 19, the TS distance measuring unit 22 (to be described later), the horizontal rotation driving component 9, the vertical rotation driving component 16 and the like are controlled.

By referring to FIG. 3 and FIG. 4, a further description will be given on the total station unit 2.

Figure 3:
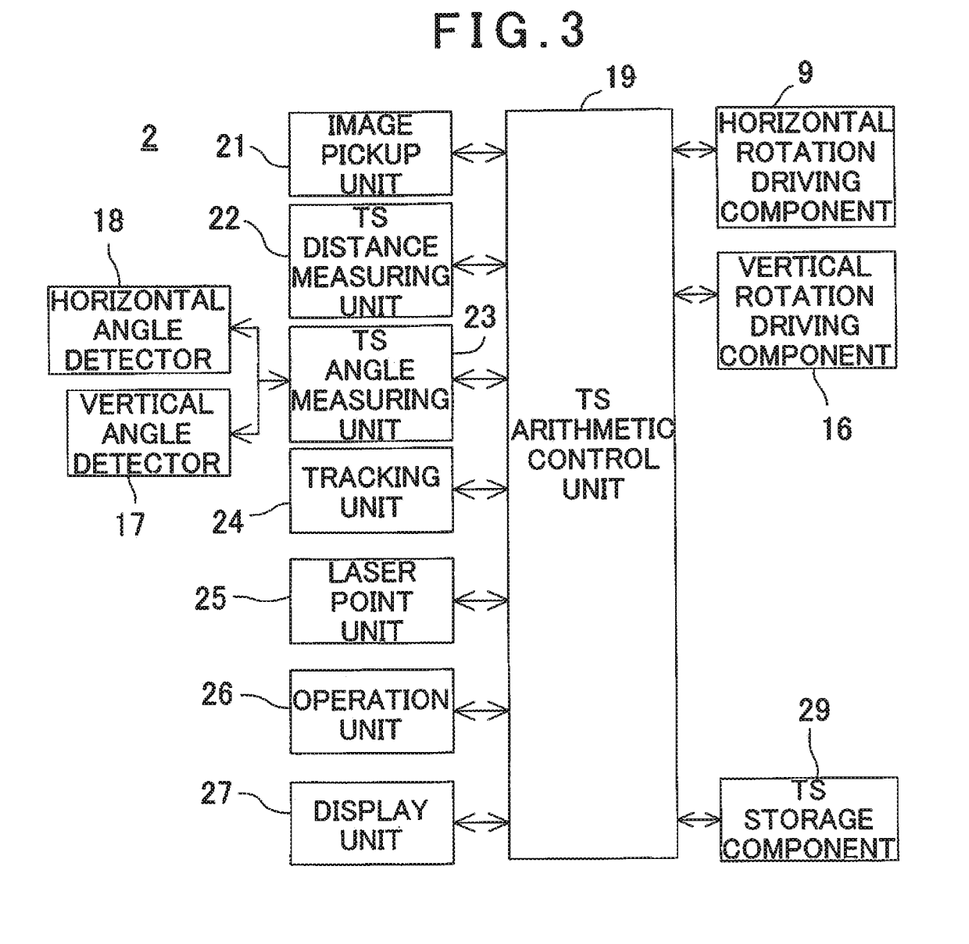
FIG. 3 is a schematical block diagram of a total station unit.

As shown in FIG. 3, the total station unit (hereinafter referred as a TS unit) 2 is mainly constituted by an image pickup unit 21, a total station distance measuring unit (hereinafter referred as a TS distance measuring unit) 22, a total station angle measuring unit (hereinafter referred as a TS angle measuring unit) 23, a tracking unit 24, a laser point unit 25, an operation unit 26, a display unit 27, a total station storage component (hereinafter referred as a TS storage component) 29, the TS arithmetic control unit 19, the horizontal rotation driving component 9 and the vertical rotation driving component 16. The TS angle measuring unit 23 is constituted by the horizontal angle detector 18 and the vertical angle detector 17. It is to be noted that, as the horizontal angle detector 18 and the vertical angle detector 17, an encoder may be used.

Figure 4:
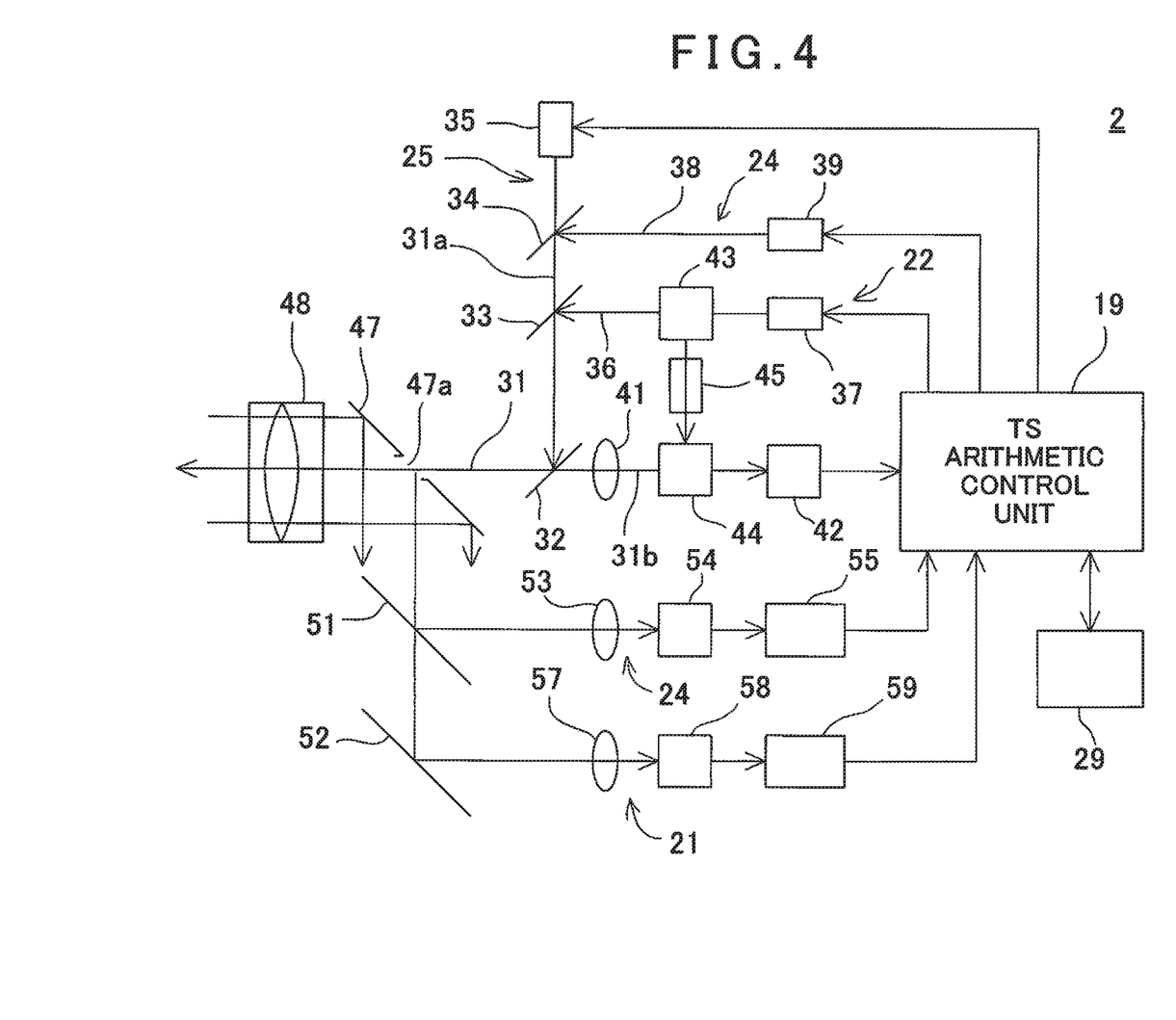
FIG. 4 is a schematical block diagram of an optical system of the total station unit.

FIG. 4 shows one example of an optical system of the TS unit 2.

In FIG. 4, reference numeral 31 denotes a distance measuring optical axis of the TS unit 2 (hereinafter referred as a TS distance measuring optical axis), and a first beam splitter 32 is provided on the TS distance measuring optical axis 31. On a reflection optical axis 31a of the first beam splitter 32, a second beam splitter 33, a third beam splitter 34 and further a laser pointer light source 35 are provided in order.

On an optical axis 36 branched by the second beam splitter 33, a distance measuring light source 37 is provided. Further, on an optical axis 38 branched by the third beam splitter 34, a tracking light source 39 is provided.

The laser pointer light source 35 emits a laser beam of a visible light as a pointer light, the distance measuring light source 37 emits a distance measuring light of an invisible light, and the tracking light source 39 emits a laser beam with a wavelength different from the pointer light and the distance measuring light as a tracking light.

The third beam splitter 34 has an optical characteristic that the pointer light of the visible light is transmitted through and the tracking light is reflected. Further, the second beam splitter 33 has an optical characteristic that the pointer light of the visible light and the tracking light are transmitted through and the distance measuring light of the invisible light is reflected. The first beam splitter 32 is designed as a half mirror with respect to the distance measuring light and has an optical characteristic that a part of the distance measuring light is transmitted through, a remaining part of the distance measuring light is reflected, and the pointer light and the tracking light are totally reflected.

On a transmission optical axis 31b of the first beam splitter 32, an image forming lens 41 and a distance measuring light receiving unit 42 are provided.

On the optical axis 36, an optical path splitting component 43 such as a half mirror, a beam splitter and the like is provided, and on the transmission optical axis 31b, an optical path coupler 44 is provided. Most part of the distance measuring light emitted from the distance measuring light source 37 passes through the optical path splitting component 43. The remaining part of the distance measuring light is received by the distance measuring light receiving unit 42 as an internal reference light through an internal reference optical path 45 and the optical path coupler 44.

On the TS distance measuring optical path 31, a perforated mirror 47 and an objective lens 48 are provided. On a reflection optical axis of the perforated mirror 47, a fourth beam splitter 51 and a reflection mirror 52 are provided. The perforated mirror 47 has an optical characteristic that the visible light and the tracking light are reflected, and the distance measuring light is transmitted through. The fourth beam splitter 51 has an optical characteristic that the tracking light is reflected and the visible light is transmitted through, and the reflection mirror 52 has an optical characteristic that the visible light is totally reflected.

On a reflection optical axis of the fourth beam splitter 51, an image forming lens 53 and a tracking light receiving component 54 are provided, and a light receiving signal from the tracking light receiving component 54 is input to a tracking calculating unit 55. The tracking light receiving component 54 is constituted by a quadrisection light receiving element, for instance, and is capable of detecting a light receiving position of the tracking light.

On an optical axis deflected by the reflection mirror 52, an image forming lens 57 and an image pickup element 58 are provided, and an image signal from the image pickup element 58 is input to an image processing component 59. The image pickup element 58 is an aggregate of pixels, for instance, a CCD or a CMOS sensor, and a position of each pixel can be specified on the image pickup element 58 by a signal output from each pixel.

The laser pointer light source 35, the distance measuring light source 37, the tracking light source 39, the third beam splitter 34, the second beam splitter 33, the objective lens 48 and the like make up a light projecting unit.

The distance measuring light source 37, the second beam splitter 33, the first beam splitter 32, the objective lens 48, the image forming lens 41, the distance measuring light receiving unit 42, the optical path splitting component 43, the optical path coupler 44, the internal reference optical path 45 and the like make up the TS distance measuring unit 22.

The distance measuring light emitted from the distance measuring light source 37 is reflected by the second beam splitter 33, is deflected by the first beam splitter 32, passes through a hole 47a of the perforated mirror 47, is made to be a parallel luminous flux by the objective lens 48, and is emitted on the TS distance measuring optical axis 31. Further, a reflected distance measuring light reflected from an object to be measured is condensed by the objective lens 48, is transmitted through the perforated mirror 47 and the first beam splitter 32, and is focused by the image forming lens 41 on the distance measuring light receiving unit 42. The distance measuring light receiving unit 42 outputs a light receiving signal to the TS arithmetic control unit 19. Further, a part of the distance measuring light is received by the distance measuring light receiving unit 42 through the optical path splitting component 43, the internal reference optical path 45 and the optical path coupler 44. The distance measuring light receiving unit 42 outputs a light receiving signal to the TS arithmetic control unit 19.

The laser pointer light source 35, the first beam splitter 32, the objective lens 48 and the like make up the laser point unit 25.

The pointer light emitted from the laser pointer light source 35 transmits through the third beam splitter 34 and the second beam splitter 33, is deflected by the first beam splitter 32 so as to coincide with the TS distance measuring optical axis 31, passes through the hole 47a, is made to be the parallel luminous flux by the objective lens 48 and is emitted from on the TS distance measuring optical axis 31.

The tracking light source 39, the objective lens 48, the perforated mirror 47, the fourth beam splitter 51, the image forming lens 53, the tracking light receiving component 54, the tracking calculating unit 55 and the like make up the tracking unit 24.

The tracking light emitted from the tracking light source 39 is reflected by the third beam splitter 34, is deflected by the first beam splitter 32 so as to coincide with the TS distance measuring optical axis 31, passes through the hole 47a, is made to be the parallel luminous flux by the objective lens 48 and is emitted. A reflected tracking light reflected from the object to be measured is condensed by the objective lens 48, is reflected by the perforated mirror 47 and the fourth beam splitter 51, and is focused by the image forming lens 53 on the tracking light receiving component 54. The tracking light receiving component 54 sends a light receiving result to the tracking calculating unit 55. The tracking calculating unit 55 calculates a light receiving position on the tracking light receiving component 54 and outputs a driving signal with respect to the horizontal rotation driving component 9 and the vertical rotation driving component 16 to the TS arithmetic control unit 19 so that the light receiving position becomes a central position of the tracking light receiving component 54.

The objective lens 48, the perforated mirror 47, the reflection mirror 52, the image forming lens 57, the image pickup element 58, the image processing component 59 and the like make up the image pickup unit 21.

The image pickup unit 21 acquires an image of the object to be measured. A background light from the object to be measured is reflected by the perforated mirror 47 through the objective lens 48, is transmitted through the fourth beam splitter 51, further is reflected by the reflection mirror 52, and is focused by the image forming lens 57 on the image pickup element 58. An image signal from the image pickup element 58 is input to the TS arithmetic control unit 19 via the image processing component 59.

In the TS storage component 29, various types of programs are stored. These programs include: an image pickup program for controlling an image acquisition by the image pickup unit 21, a light emission control program for controlling a light emission of the laser pointer light source 35, the distance measuring light source 37, the tracking light source 39 and the like, a distance measuring program for controlling a distance measurement by the TS distance measuring unit 22, an angle measuring program for calculating a directional angle based on obtainments of a horizontal angle detection and a vertical angle detection by the TS angle measuring unit 23 and a result of the angle detection, a tracking program for executing a tracking, an image processing program for processing an image acquired by the image pickup unit 21, and other programs. Further, in the TS storage component 29, a data storage region is formed, and in the data storage region, data such as image data acquired by the image pickup unit 21, distance measurement data acquired by the TS distance measuring unit 22, angle measurement data acquired by the TS angle measuring unit 23 and the like are stored. The image data, the distance measurement data, and the angle measurement data are associated with each other.

The TS arithmetic control unit 19 performs required calculations based on the data as stored and executes required controls based on the programs as stored.

Next, by referring to FIG. 1, a description will be given on an approximate arrangement of the laser scanner unit 3.

The laser scanner unit (hereinafter referred as an LS unit) 3 has a housing 62 having a recess portion 61 formed at a center, and the housing 62 is fixed to an upper surface of the frame unit 11.

In the housing 62, a scanning rotation shaft 63 with a horizontal axis is rotatably provided. One end portion of the scanning rotation shaft 63 protrudes to the recess portion 61, and a scanning mirror 64 is fixed to a forward end of the one end portion. A scanning motor 65 is accommodated inside the housing 62, and the scanning motor 65 is connected to the scanning rotation shaft 63. In a manner that the scanning motor 65 rotates the scanning rotation shaft 63, the scanning mirror 64 is designed so as to be rotated.

Further, on the other end portion of the scanning rotation shaft 63, a laser scanner vertical angle detector (hereinafter referred as an LS vertical angle detector) 66 is provided. The LS vertical angle detector 66 is designed so as to detect a rotation angle (a vertical angle, that is, a rotation angle of the scanning mirror 64) of the scanning rotation shaft 63 in real time. It is to be noted that, as the LS vertical angle detector 66, an encoder may be used.

An LS distance measuring unit 67 is accommodated in the housing 62 and provided at a part faced the scanning mirror 64. From the LS distance measuring unit 67, a distance measuring light (a pulsed laser beam) 68 is emitted toward the scanning mirror 64.

An optical axis of the distance measuring light 68 coincides with an axis of the scanning rotation shaft 63 and is deflected at a right angle by the scanning mirror 64. By rotating the scanning mirror 64 around the scanning rotation shaft 63, the distance measuring light 68 deflected by the scanning mirror 64 is arranged to be rotatably irradiated.

An intersection point between the axis of the scanning rotation shaft 63 (that is, the optical axis of the distance measuring light 68) and the scanning mirror 61 is set as a second mechanical reference point of the LS unit 3. A vertical line passing through the second mechanical reference point is set so as to coincide with the vertical line 7.

Therefore, as described above, the first mechanical reference point of the TS unit 2 and the second mechanical reference point of the LS unit 3 exist on the same vertical line 7. Further, a distance between the first mechanical reference point and the second mechanical reference point is known.

The distance measuring light 68 as rotatably irradiated scans the object to be measured, and a reflected distance measuring light 68' (not shown) as reflected by the object to be measured enters the LS distance measuring unit 67 via the scanning mirror 64. The LS distance measuring unit 67 receives the reflected distance measuring light 68', obtains a reciprocating time of the pulsed light, and performs a distance measurement for each pulsed light (Time of Flight).

Further, as described above, a vertical angle of the scanning mirror 64 is detected by the LS vertical angle detector 66 in real time, and the distance measurement is performed for each pulsed light, and the vertical angle is detected for each pulsed light.

The LS unit 3 rotatably irradiates the distance measuring light 68 in the vertical direction and detects the vertical angle. As a result, the LS unit 3 acquires two-dimensional point cloud data having two-dimensional coordinates of the distance and the vertical angle.

By referring to FIG. 5 and FIG. 6, a further description will be given on the LS unit 3.

Figure 5:
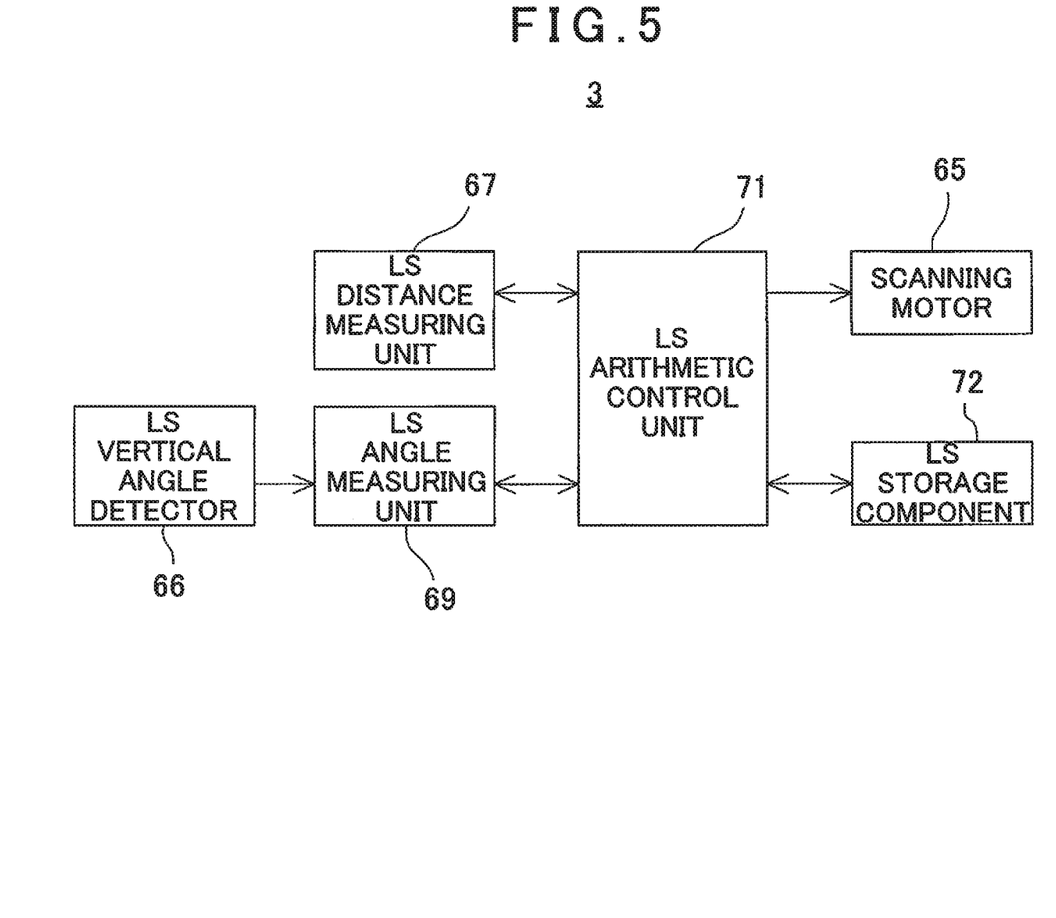
FIG. 5 is a schematical block diagram of a laser scanner unit.

As shown in FIG. 5, the LS unit 3 is mainly constituted by the LS vertical angle detector 66, the LS distance measuring unit 67, an LS angle measuring unit 69, a laser scanner arithmetic control unit (hereinafter referred as an LS arithmetic control unit) 71, the scanning motor 65, a laser scanner storage component (hereinafter referred as an LS storage component) 72.

In the LS storage component 72, various types of programs are stored. These programs include: an LS distance measuring program for rotatably irradiating the distance measuring light 68 emitted from the LS distance measuring unit 67 and performing the distance measurement for each pulsed light, an angle detection program for detecting an angle of the scanning mirror 64 in real time, a data association program for synchronizing and associating between various types of data acquired by the TS unit 2 and data acquired by the LS unit 3, and other programs. Further, in the LS storage component 72, a data storage region is formed, and in the data storage region, a distance measurement result and an angle measurement result (point cloud data) for each pulsed light are stored.

Figure 6:
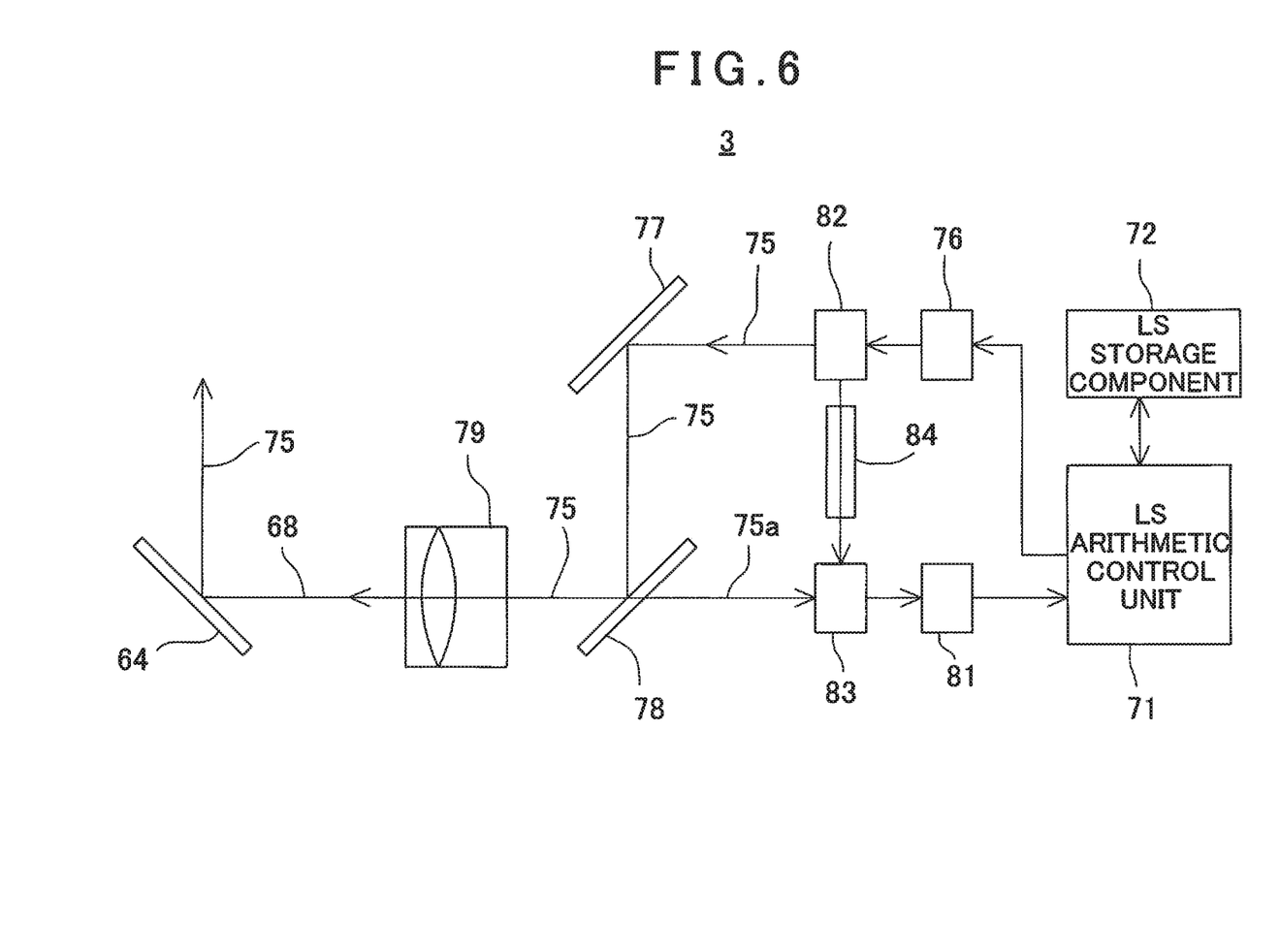
FIG. 6 is a schematical block diagram of an optical system of the laser scanner unit.

FIG. 6 shows one example of an optical system of the LS unit 3.

In FIG. 6, reference numeral 75 denotes a distance measuring optical axis of the LS unit 3 (hereinafter referred as an LS distance measuring optical axis), and on the LS distance measuring optical axis 75, a distance measuring light source 76 and a reflection mirror 77 are provided. On the LS distance measuring optical axis 75 deflected by the reflection mirror 77, a beam splitter 78 is provided, and on the LS distance measuring optical axis 75 deflected by the beam splitter 78, an objective lens 79 and the scanning mirror 64 are provided. The distance measuring light source 76 emits the distance measuring light 68 of an invisible light. Further, it is preferable that a wavelength of the distance measuring light 68 is different from a wavelength of the distance measuring light emitted by the distance measuring light source 37.

The beam splitter 78 has an optical characteristic that a part of the distance measuring light 68 is reflected, and a remaining part of the distance measuring light 68 is transmitted through. Further, it is preferable that the beam splitter 78 has an optical characteristic that the distance measuring light emitted by the distance measuring light source 37 is not transmitted through.

The optical axis transmitted through the beam splitter 78 is a light receiving optical axis 75*a*, and on the light receiving optical axis 75*a*, a light receiving element 81 is provided.

Between the distance measuring light source 76 of the LS distance measuring optical axis 75 and the reflection mirror 77, an optical path splitting component 82 such as a half mirror, a beam splitter and the like is provided, and between the beam splitter 78 of the light receiving optical axis 75*a* and the light receiving element 81, an optical path coupler 83 is provided.

The optical path splitting component 82 reflects and leads a part of the distance measuring light 68 as an internal reference light to an internal reference optical path 84. The optical path coupler 83 couples the reflected distance measuring light 68' transmitted through the beam splitter 78 and the internal reference light passed through the internal reference optical path 84 and is designed so that the reflected distance measuring light 68' and the internal reference light are received by the light receiving element 81.

The distance measuring light source 76 is controlled by the LS arithmetic control unit 71 so as to emit the distance measuring light 68 in a required state such as a light intensity as required, a pulse interval as required and the like. Further, the LS arithmetic control unit 71 associates the distance measurement result with the angle measurement result (the point cloud data) for each pulsed light and stores the distance measurement result and the angle measurement result in the data storage region.

By referring to FIG. 7, a description will be given on an operation of the present embodiment.

Figure 7:
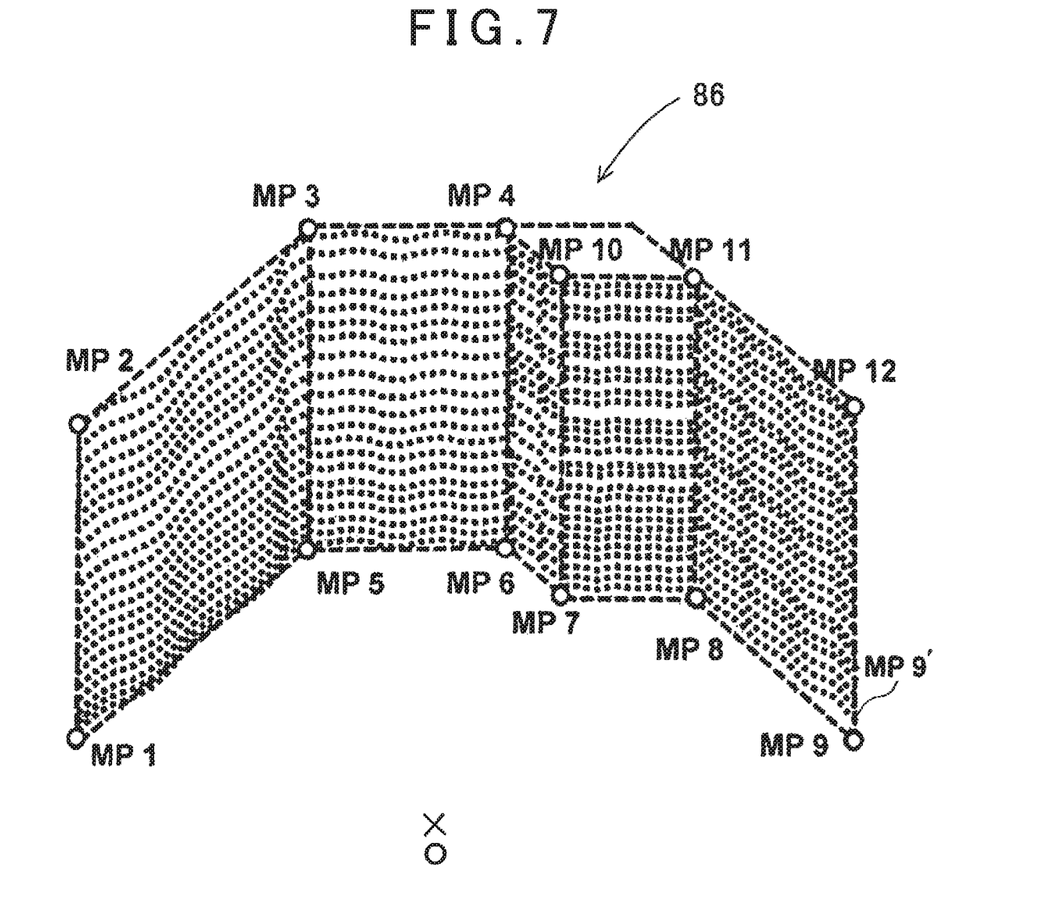
FIG. 7 is a drawing to show an image in a state where point cloud data is superimposed on an entire image.

In FIG. 7, reference numeral 86 denotes an object to be measured. In a case where the surveying system 1 is installed inside a building being constructed, the object to be measured 86 is a wall surface inside the building or the like.

The surveying system 1 is installed at a suitable position O inside the building. It is to be noted that, regarding an installation position of the surveying system 1, if a reference point or the like is set on a floor surface, the reference point is preferable. In a case where the reference point is unclear, the installation position of the surveying system 1 can be decided based on a measurement result of the object to be measured 86 by the surveying system 1.

After installing the surveying system 1, a leveling of the TS unit 2 is performed by the leveling unit 6.

After the leveling is completed, the LS unit 3 is operated.

While the scanning motor 65 is driven and the scanning mirror 64 is rotated at a constant speed of a predetermined rotation speed, the distance measuring light 68 is emitted from the LS distance measuring unit 67. The distance measuring light 68 is rotatably irradiated by the scanning mirror 64 in the vertical direction. Further, the horizontal rotation driving component 9 is driven, and the frame unit 11 (the TS unit 2) is horizontally rotated.

By a cooperation of the vertical rotation of the scanning mirror 64 and the horizontal rotation of the frame unit 11, the distance measuring light 68 is horizontally rotated while being rotatably irradiated in the vertical direction and scans an entire object to be measured 86.

The reflected distance measuring light 68' of the distance measuring light 68 enters the scanning mirror 64 and further enters the light receiving element 81 through the objective lens 79, the beam splitter 78 and the optical path coupler 83. Further, a part of the distance measuring light 68 (the internal reference light) split by the optical path splitting component 82 enters the light receiving element 81 through the internal reference optical path 84 and the optical path coupler 83.

The LS arithmetic control unit 71 obtains a light receiving time difference between a light receiving signal of the internal reference light emitted by the light receiving element 81 and a light receiving signal of the reflected distance measuring light 68' emitted by the light receiving element 81 and calculates a distance for each distance measuring light 68 based on the light receiving time difference. Further, the LS arithmetic control unit 71 also obtains a vertical angle of each distance measuring light 68 from the LS angle measuring unit 69.

The LS arithmetic control unit 71 associates the distance measurement data with the vertical angle for each pulsed light and prepares two-dimensional point cloud data of the entire object to be measured 86 in time series.

In a process of acquiring the two-dimensional point cloud data by the LS unit 3, an image of the object to be measured 86 is acquired by the image pickup unit 21. It is to be noted that an acquisition of the image may be executed after the point cloud data is acquired.

Normally, since a field angle of the objective lens 48 is small, in order to acquire an image of the entire object to be measured 86, it is necessary that partial images are acquired and synthesized. It is to be noted that a camera with a wide field angle may be separately provided and a single entire image may be acquired.

The TS arithmetic control unit 19 rotates the telescope unit 13 in an up and down direction in a process of horizontally rotating the frame unit 11 at a constant speed and controls an image pickup timing so as to form a predetermined overlap portion between the partial images. The image processing component 59 makes the partial images match by using the overlap portions and prepares an entire image including the entire object to be measured 86. The entire image is displayed on the display unit 27.

Thus, the point cloud data of the object to be measured 86 and the entire image of the object to be measured 86 are acquired. Since the entire image is acquired while rotating at the constant speed, a length in the horizontal direction indicates a horizontal angle and a time.

FIG. 7 shows a drawing on which the point cloud data is superimposed on the entire image.

Since the point cloud data is acquired in time series, by drawing the point cloud data on the entire image corresponding to this time series, the point cloud data can be superimposed on the entire image. A state in which the point cloud data is superimposed on the entire image is displayed on the display unit 27.

By superimposing the point cloud data on the entire image, an association between the point cloud data and the object to be measured can be performed on the image.

Although the object to be measured is constituted by planes, as shown in FIG. 7, since the point cloud data acquired by the LS unit 3 has poor measurement accuracy, the point cloud is wavy or an outer shape is distorted.

In the present embodiment, a predetermined point is measured by the TS unit 2, a measurement result of the point cloud data is corrected based on the measurement result of the TS unit 2, and a measurement result with high accuracy can be obtained. Further, an association between the point cloud data and the measurement result of the TS unit 2 is made based on the entire image.

First, a specific point is set from the entire image. As the specific point, a point which can be easily specified in the object to be measured 86, for instance, an edge of each of wall surfaces, that is, MP1 to MP12, is selected.

By means of the telescope 15, MP1 to MP12 are sighted, and a distance measurement and an angle measurement are performed with respect to each point. It is to be noted that, in a case where the installation position of the TS unit 2 is unknown, the position of the TS unit 2 with respect to the object to be measured 86 can be measured based on the measurement results of at least three points among MP1 to MP12.

It is to be noted that the specific point may be directly set according to a shape of the object to be measured (the edge of the wall surface, for instance), the edge of the wall surface is directly sighted by the telescope 15, and the distance measurement may be performed. In this case, it is preferable that a zoom function is provided with the telescope 15 so as to facilitate a sighting operation.

The measurement results by the TS unit 2 are indicated by white circle in FIG. 7. With respect to MP1 to MP12, the result measured by the LS unit 3 does not necessarily match the result measured by the TS unit 2.

Further, since the first mechanical reference point of the TS unit 2 and the second mechanical reference point of the LS unit 3 exist on the same vertical line, a difference between coordinates of MP1 to MP12 measured by the TS unit 2 and coordinates of MP1 to MP12 measured by the LS unit 3 is caused by a difference of measurement accuracies between the TS unit 2 and the LS unit 3.

The measurement accuracy of the TS unit 2 is high, and the measurement accuracy of the LS unit 3 is lower than the measurement accuracy of the TS unit 2. Therefore, by correcting the measurement result of the LS unit 3 based on the measurement result of the TS unit 2, the measurement accuracy of the point cloud data can be improved.

It is to be noted that, although in a vertical angle measurement by the TS unit 2 and a vertical angle measurement by the LS unit 3 of the measuring points, a distance between the first mechanical reference point and the second mechanical reference point has an influence, the distance between the first mechanical reference point and the second mechanical reference point is known, and further a distance to the measuring point becomes known by a measurement by the TS unit 2. Therefore, an angle to be corrected can be obtained based on the distance between the first mechanical reference point and the second mechanical reference point and on the measurement result.

Next, paying attention to MP9 in FIG. 7, a deviation between a specific point MP9 of the TS unit 2 and a specific point MP9' of the LS unit 3 is obtained on the image, and the point cloud data is corrected based on the deviation so that the specific point MP9' coincides with the specific point MP9.

It is to be noted that since the specific point extracted from the image has the vertical angle and the horizontal angle, it may be so arranged that the vertical angle and the horizontal angle are input from the operation unit 26, the TS distance measuring optical axis 31 is directed toward the specific point based on the vertical angle and the horizontal angle, the distance measurement is performed by the TS unit 2, the distance measurement result by the TS unit 2 and the distance measurement result of the specific point corresponding to the point cloud data are compared, and the point cloud data is corrected based on the deviation between both of the measurement results.

The other specific points MP1 to MP8 and MP10 to MP12 are corrected similarly.

Since the object to be measured 86 is constituted by planes, planes with MP1 to MP12 as apexes are calculated in the point cloud data, and the point cloud data is corrected so that each point of all the point cloud data exists on the planes as calculated. A drawing with high accuracy is obtained by the point cloud data.

By superimposing the point cloud data as corrected and the entire image with each other again, an image with highly accurate three-dimensional data can be prepared.

By obtaining the image having the three-dimensional data, a survey setting work can be performed for the object to be measured 86.

For instance, coordinate data of a survey setting point is input based on design data from the operation unit 26. The TS arithmetic control unit 19 drives the horizontal rotation driving component 9 and the vertical rotation driving component 16 based on the coordinate data and directs the TS distance measuring optical axis 31 toward the survey setting point.

Next, the laser pointer light source 35 is turned on, and the pointer light is emitted.

Since the optical axis of the laser point unit 25 coincides with the TS distance measuring optical axis 31, the irradiating point of the pointer light becomes the survey setting point, and the survey setting point can be set.

Thus, according to the present invention, an acquisition of the point cloud data with high accuracy and the survey setting work with respect to the object to be measured can be performed by one surveying system.

Figure 8:
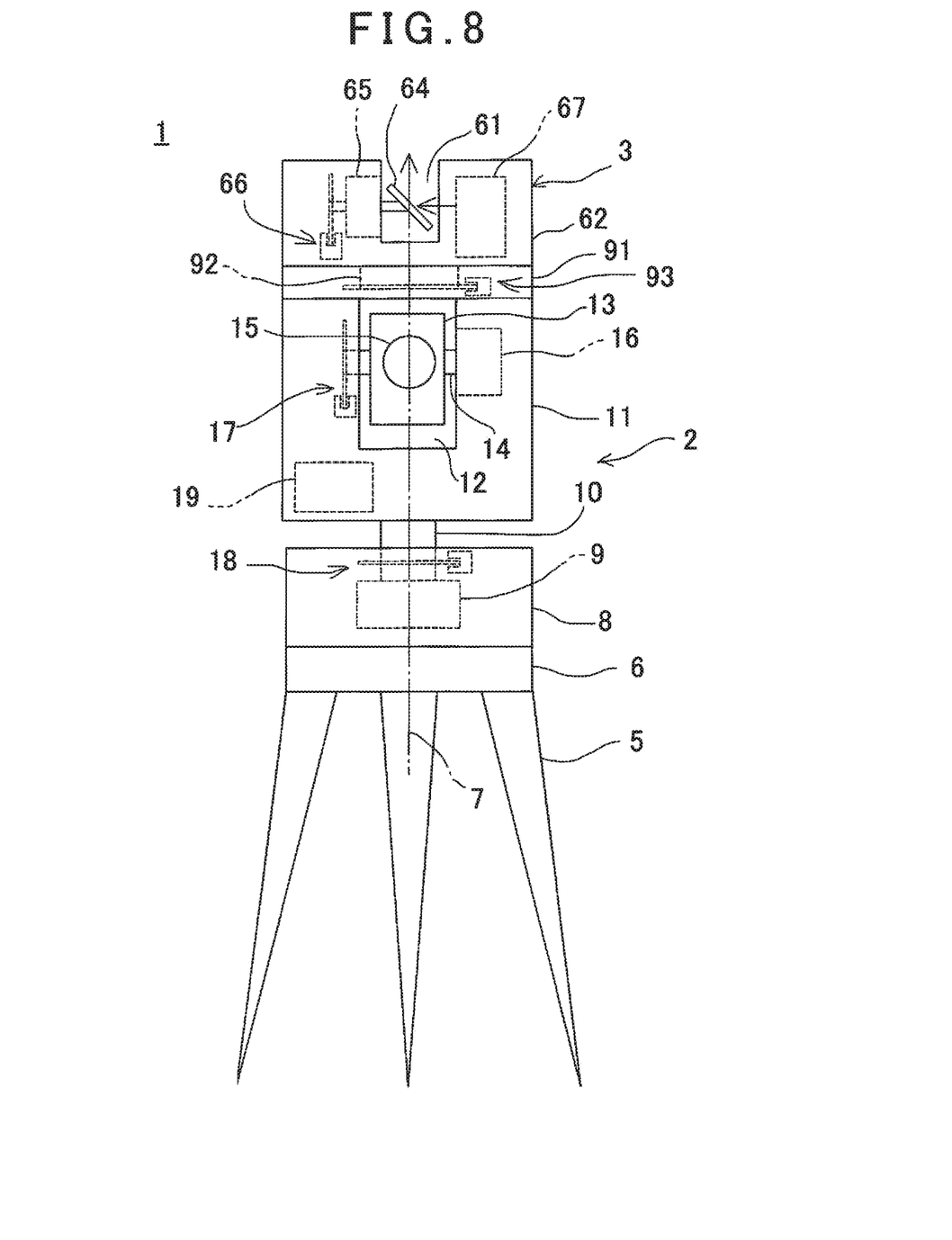
FIG. 8 is a schematical front view of a surveying system according to a second embodiment of the present invention.

By referring to FIG. 8, a description will be given on a second embodiment. It is to be noted that, in FIG. 8, what are equivalent to components as shown in FIG. 1 are referred by the same symbol, and detailed description thereof will not be given here.

In the first embodiment as described above, although an acquisition of the point cloud data by an LS unit 3 and a distance measurement by a TS unit 2 are performed separately, in the second embodiment, the acquisition of the point cloud data by the LS unit 3 and the distance measurement by the TS unit 2 can be performed in parallel simultaneously or without being limited by each other.

A horizontal driving unit 91 is fixed on an upper surface of a frame unit 11, and the LS unit 3 is provided on the frame unit 11 via the horizontal driving unit 91.

The horizontal driving unit 91 includes an LS horizontal rotation motor 92 and an LS horizontal angle detector 93, and the LS unit 3 is connected to an output shaft of the LS horizontal rotation motor 92.

An axis of the output shaft of the LS horizontal rotation motor 92 coincides with a vertical line 7, that is, an axis of a horizontal rotation shaft 10. Further, a second mechanical reference point of the LS unit 3 provided on the TS unit 2 via the horizontal driving unit 91 also exits on the vertical line 7, and a distance between the first mechanical reference point of the TS unit 2 and the second mechanical reference point is known.

A driving of the LS horizontal rotation motor 92 is controlled by an LS arithmetic control unit 71, and the LS unit 3 is relatively rotated with respect to the frame unit 11. The LS horizontal angle detector 93 detects a rotation of the output shaft of the LS horizontal rotation motor 92. Therefore, an angle detected by the LS horizontal angle detector 93 becomes a relative rotation angle of the LS unit 3 with respect to the frame unit 11.

A detection result of the LS horizontal angle detector 93 is output to the LS arithmetic control unit 71, and further is transmitted to the TS arithmetic control unit 19.

The TS arithmetic control unit 19 calculates an absolute horizontal angle (a horizontal angle with respect to a base unit 8) of the LS unit 3 based on a detection result of the horizontal angle detector 18 and a detection result of the LS horizontal angle detector 93.

Further, the detection result from the horizontal angle detector 18 is transmitted to the LS arithmetic control unit 71. In the LS arithmetic control unit 71, it may be so designed that the absolute horizontal angle of the LS unit 3 with respect to the base unit 8 is calculated based on the detection result of the horizontal angle detector 18 and the detection result of the LS horizontal angle detector 93.

The LS arithmetic control unit 71 can calculate a horizontal rotation speed of the LS unit 3 with respect to the base unit 8 based on a rotation angle detection result from the horizontal angle detector 18 and a rotation angle detection result from the LS horizontal angle detector 93. In a case where the TS unit 2 and the LS unit 3 are driven independently, the LS arithmetic control unit 71 controls the LS horizontal rotation motor 92 so that the horizontal rotation speed as calculated becomes a constant speed rotation as predetermined.

In a case where the TS unit 2 and the LS unit 3 are operated in parallel, a horizontal angle of the point cloud data acquired by the LS unit 3 is based on the base unit 8. Further, since the second mechanical reference point of the LS unit 3 and the first mechanical reference point of the TS unit 2 exist on the same vertical line 7, an association between the point cloud data and a measurement result measured by the TS unit 2 can be executed easily.

Thus, a measuring work by the TS unit 2 and the acquisition of the point cloud data by the LS unit 3 can be performed in parallel. Therefore, a correction of the point cloud data as acquired can be executed in substantially real time, and the acquisition of the point cloud data and the survey setting work can be executed in parallel. As a result, the survey setting work can be performed efficiently.

It is to be noted that, in the second embodiment, since the LS horizontal angle detector 93 is provided, the LS unit 3 can acquire three-dimensional point cloud data with a horizontal angle, a vertical angle, and a distance.

Therefore, based on the horizontal angle and the vertical angle of each point of the point cloud data, the point cloud data can be superimposed on an entire image. Further, based on the horizontal angle and the vertical angle of each point, an association between each point and a point measured by the TS unit 2 can be also performed.

Although in the first embodiment as described above, the association between the point cloud data and the measurement result of the TS unit 2 was performed based on an image, it may be so designed that a synchronization signal generating unit for generating a synchronization signal in common with the TS unit 2 and the LS unit 3 is provided, and the association between the point cloud data and the measurement result of the TS unit 2 is performed based on the synchronization signal generated by the synchronization signal generating unit.

For instance, it may be so configured that GPS receivers are provided in the TS unit 2 and the LS unit 3 respectively so that each of the TS unit 2 and the LS unit 3 can obtain a GPS time, a time stamp is given to an acquired signal (a horizontal angle detection signal of the horizontal angle detector 18, for instance) of the TS unit 2, a time stamp is given to an acquired signal (measurement data (point data) of each point of the point cloud data) of the LS unit 3, and both of the signals are associated with each other based on the time stamps.

Further, it may be so configured that the TS arithmetic control unit 19 includes a timing generator (a clock signal generator, for instance), a timing signal from the timing generator is acquired by the LS arithmetic control unit 71, a common timing signal is given to the acquired signal of the TS unit 2 and the acquired signal of the LS unit 3 as time stamps respectively, and both of the signals are associated with each other based on the time stamps.

It is to be noted that, although in the embodiments as described above, a scanning mirror 64 is rotated, and a laser beam is rotatably irradiated, it may be so configured that a rotary unit is supported by a scanning rotation shaft 63 (see FIG. 1), an optical system shown in FIG. 6 is built in the rotary unit, the laser beam is emitted from the rotary unit, the rotary unit is rotated by the scanning rotation shaft 63, and the laser beam is rotatably irradiated.

Further, in a case where the first mechanical reference point and the second mechanical reference point do not exist on the same vertical line, it may be so configured that a relation between both of the mechanical reference points is made to be known, acquired data of the TS unit 2 and acquired data of the LS unit 3 are corrected according to the known relation, and both of the data are associated with each other.

It is to be noted that although, in a laser scanner unit in the embodiments as described above, a pulsed light is used as a distance measuring light and a distance measurement is performed by a TOF method, it may be so configured that the distance measuring light of the laser scanner unit is made to be a modulated continuous light, a phase difference between an emitted light and a reflected light is obtained, and the distance measurement is performed based on the phase difference.

The invention claimed is:

1. A surveying system comprising a total station unit, a laser scanner unit and an arithmetic control unit, wherein said total station unit comprises a frame unit capable of horizontally rotating, a telescope unit provided capable of vertically rotating on said frame unit, an image pickup unit adapted to acquire an entire image of an object to be measured, a horizontal angle detector for detecting a horizontal angle of said frame unit, a vertical angle detector for detecting a vertical angle of said telescope unit, a total station distance measuring unit accommodated in said telescope unit and a total station arithmetic control unit, wherein said laser scanner unit is provided on an upper surface of said frame unit and is configured so as to acquire point cloud data by rotatably irradiating a laser beam in a vertical direction, and wherein said arithmetic control unit is configured to acquire said point cloud data of said entire object to be measured by a cooperation of a horizontal rotation of said frame unit and a rotary irradiation of the laser beam by said laser scanner unit, to superimpose said point cloud data on said entire image which said image pickup unit acquired, to set specific points from said entire image, to measure said specific points of said object to be measured by said total station unit, to compare a distance measurement result of said total station unit of said specific points with a distance measurement result of said specific points corresponding to said point cloud data, to obtain a deviation, to correct said point cloud data based on said deviation, and to superimpose said point cloud data as corrected on said entire image again.

2. The surveying system according to claim 1, wherein said total station unit and said laser scanner unit are arranged so that a first mechanical reference point of said total station unit and a second mechanical reference point of said laser scanner unit are positioned on a same vertical line.

3. The surveying system according to claim 1, wherein said total station unit includes a laser point unit and is configured so as to emit a pointer light to the image superimposed with said point cloud data and indicate a survey setting point.

4. The surveying system according to claim 1, wherein a horizontal driving unit is provided on said frame unit, said laser scanner unit is provided on said total station unit via said horizontal driving unit, said laser scanner unit is capable of horizontally rotating by said horizontal driving unit, wherein said horizontal driving unit includes a laser scanner horizontal angle detector for detecting a relative rotation between said frame unit and said laser scanner unit, and wherein said arithmetic control unit is configured to control said horizontal driving unit so as to rotate said laser scanner unit at a predetermined rotation speed based on a detection result of said laser scanner horizontal angle detector and said horizontal angle detector.

5. The surveying system according to claim 1 further comprising a synchronization signal generating unit, wherein a synchronization signal issued from said synchronization signal generating unit is given to point data of said point cloud data as a time stamp and is given to horizontal angle data of said horizontal angle detector as a time stamp when said point data is acquired, and an association between said point data and said horizontal angle data is performed through the time stamps.

6. The surveying system according to claim 1, wherein said specific points are apexes of a plane, and said arithmetic control unit is configured to calculate the plane based on said specific points as the apexes in said point cloud data, and to correct said point cloud data so that each point of all said point cloud data exists on the plane as calculated.

7. The surveying system according to claim 6, wherein said total station unit and said laser scanner unit are arranged so that a first mechanical reference point of said total station unit and a second mechanical reference point of said laser scanner unit are positioned on a same vertical line.

8. The surveying system according to claim 6, wherein said total station unit includes a laser point unit and is configured so as to emit a pointer light to the image superimposed with said point cloud data and indicate a survey setting point.

9. The surveying system according to claim 6, wherein a horizontal driving unit is provided on said frame unit, said laser scanner unit is provided on said total station unit via said horizontal driving unit, said laser scanner unit is capable of horizontally rotating by said horizontal driving unit, wherein said horizontal driving unit includes a laser scanner horizontal angle detector for detecting a relative rotation between said frame unit and said laser scanner unit, and wherein said arithmetic control unit is configured to control said horizontal driving unit so as to rotate said laser scanner unit at a predetermined rotation speed based on a detection result of said laser scanner horizontal angle detector and said horizontal angle detector.

10. The surveying system according to claim 6 further comprising a synchronization signal generating unit, wherein a synchronization signal issued from said synchronization signal generating unit is given to point data of said point cloud data as a time stamp and is given to horizontal angle data of said horizontal angle detector as a time stamp when said point data is acquired, and an association between said point data and said horizontal angle data is performed through the time stamps.

* * * * *